United States Patent
Föhl

[11] Patent Number: 5,335,941
[45] Date of Patent: Aug. 9, 1994

[54] VEHICLE DECELERATION SENSOR

[75] Inventor: Artur Föhl, Schorndorf, Fed. Rep. of Germany

[73] Assignee: TRW Repa GmbH, Alfdorf, Fed. Rep. of Germany

[21] Appl. No.: 989,033

[22] Filed: Dec. 10, 1992

[30] Foreign Application Priority Data

Dec. 10, 1991 [DE] Fed. Rep. of Germany ....... 4140691

[51] Int. Cl.$^5$ ..................... B60R 22/46; H01H 35/14
[52] U.S. Cl. .................... 280/206; 280/735; 297/480; 200/61.46 R; 200/61.49; 200/61.53
[58] Field of Search .............. 280/806, 735; 180/282; 200/61.45 R, 61.48, 61.49, 61.53, 478, 480

[56] References Cited

U.S. PATENT DOCUMENTS

| | | | |
|---|---|---|---|
| 3,439,137 | 4/1969 | Green et al. | 200/61.45 R |
| 3,655,928 | 4/1972 | Engel | 200/61.45 R |
| 3,655,929 | 4/1972 | Engel et al. | 200/61.56 R |
| 3,674,951 | 7/1972 | Haruna et al. | 200/61.53 |
| 3,762,494 | 10/1973 | Peters | 200/61.45 R |
| 3,778,572 | 12/1973 | Matsui et al. | 200/61.48 |
| 4,001,185 | 1/1977 | Mitsui et al. | 200/61.45 R |
| 4,358,135 | 11/1982 | Tsuge et al. | 280/806 |
| 4,814,564 | 3/1989 | Ritter | 200/61.49 |
| 5,005,861 | 4/1991 | Breed et al. | 200/61.53 |
| 5,011,181 | 4/1991 | Laucht et al. | 280/735 |
| 5,031,931 | 7/1991 | Thuen et al. | 280/735 |
| 5,037,134 | 8/1991 | Tabata | 280/806 |
| 5,098,122 | 3/1992 | Breed et al. | 280/735 |
| 5,153,393 | 10/1992 | Breed et al. | 200/61.45 R |
| 5,178,410 | 1/1993 | Thuen et al. | 280/735 X |

FOREIGN PATENT DOCUMENTS

| | | |
|---|---|---|
| 0326367 | 8/1989 | European Pat. Off. . |
| 3128594 | 2/1983 | Fed. Rep. of Germany . |
| 3509054 | 4/1986 | Fed. Rep. of Germany . |
| 81233574 | 12/1986 | Fed. Rep. of Germany . |
| 4109623 | 10/1991 | Fed. Rep. of Germany ...... 280/806 |
| 4022388 | 1/1992 | Fed. Rep. of Germany . |
| 4106103 | 3/1992 | Fed. Rep. of Germany . |
| 0555456 | 5/1977 | U.S.S.R. . |
| 1181001 | 9/1985 | U.S.S.R. . |
| 2236619 | 4/1991 | United Kingdom . |
| 2236857 | 4/1991 | United Kingdom . |
| 9015732 | 12/1990 | World Int. Prop. O. . |

Primary Examiner—Margaret A. Focarino
Assistant Examiner—Peter C. English
Attorney, Agent, or Firm—Tarolli, Sundheim & Covell

[57] ABSTRACT

A vehicle-sensitive mechanical contactor for activating a restraining system in vehicles is provided with an inertial mass ball (12) movably accommodated in a housing (10). A first contact spring (14) bears on the surface of the ball (12) under predetermined bias. In the rest position of the ball (12) the first contact spring (14) is at a predetermined distance (s) from a second contact spring (16). The second contact spring (16) is deflectable for dampening the impact exerted by the ball (12). Furthermore, a spring blade (18) is in frictional engagement with the upper side of the ball (12) to additionally dampen the movements thereof. With extremely small dimensions and very simple construction the contactor ensures a reliable bounce-free contacting and is suitable for restraining systems in vehicles, such as belt pretensioners or airbag impact protection systems.

12 Claims, 3 Drawing Sheets

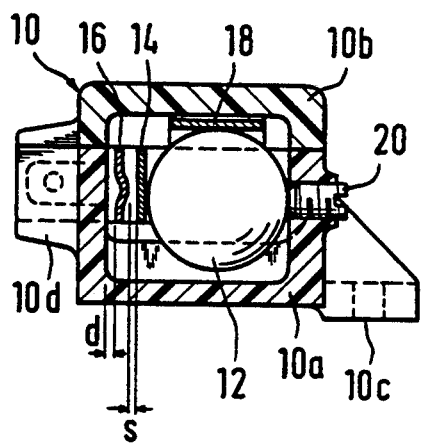
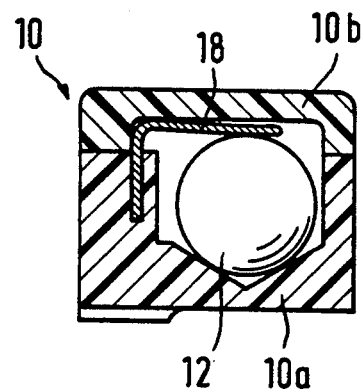
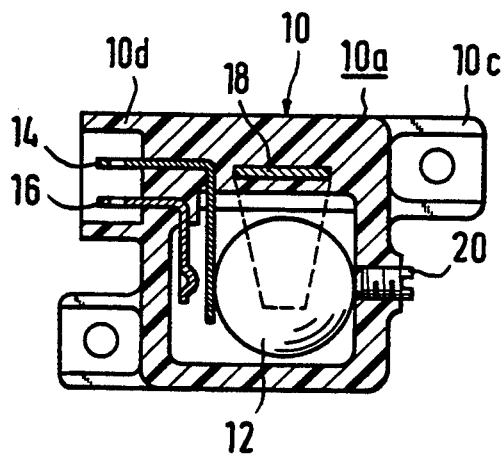
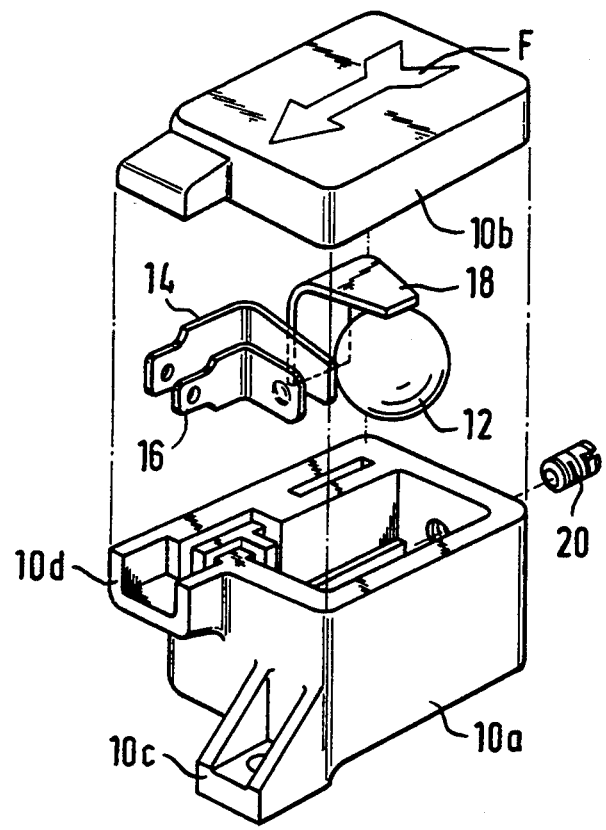

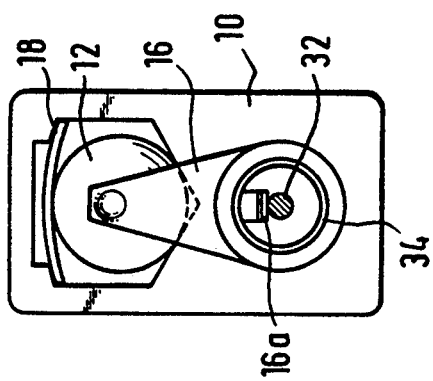
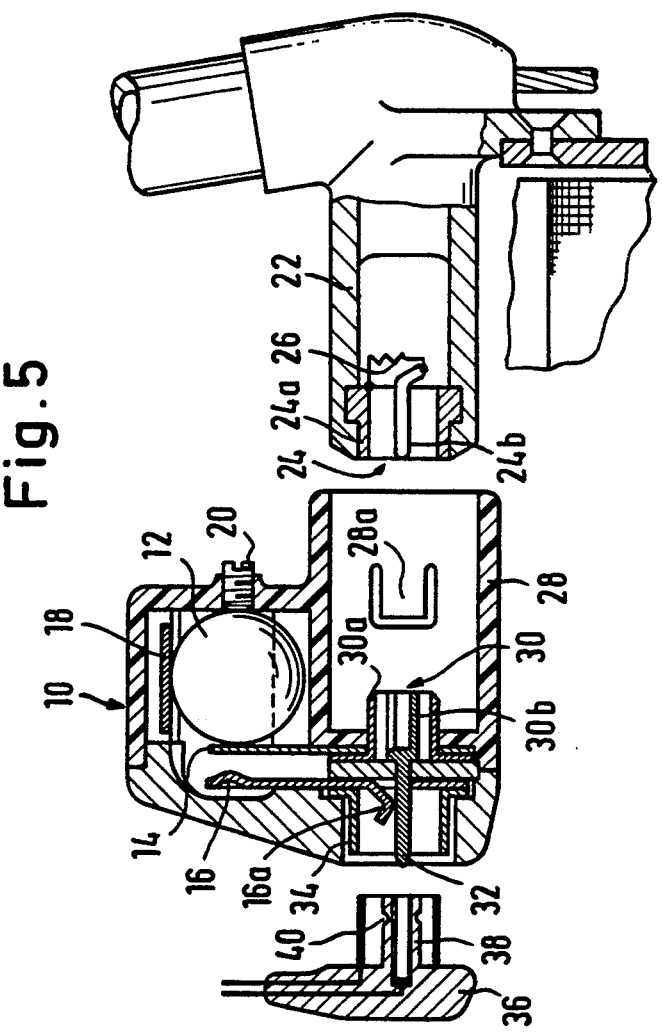

VEHICLE DECELERATION SENSOR

The present invention relates to a vehicle-sensitive mechanical contactor for activating a restraining system in vehicles.

To activate a plurality of restraining systems in vehicles, for example belt pretensioners in safety belt systems or airbag impact protection systems, a central vehicle-sensitive sensor is usually employed, the electrical output signal of which is processed in an electronic control unit to provide an activating signal. This activating signal is supplied to an electrical igniter on a pyrotechnical gas generator of the restraining system. The expenditure for the electronic control unit is considerable. It makes up a high proportion of the total costs of the restraining systems.

Mechanical contactors have also already been proposed which comprise an inertial body which is movably mounted in a housing. The inertial body is electrically conductive and responds to the vehicle deceleration to establish an electrical contact with a contact element arranged in the housing. These mechanical contactors can be implemented with low expenditure but hitherto were unable to establish themselves because of their insufficient reliability. The present invention provides a vehicle-sensitive mechanical contactor which is distinguished by particularly simple construction and reliable contacting.

According to the invention an inertial mass body is movably received in a housing fixed to the vehicle bodywork. A first spring-loaded contact element bears on the inertial body and is arranged at a predetermined distance from a second contact element cooperating with the first contact element as a contact pair and urges the inertial body with predetermined force into a rest position away from the second contact element. Preferably, each contact element is a contact spring. The first contact spring resiliently holds the inertial body in its rest position. Only when the vehicle deceleration exceeds a predetermined threshold value will the biasing force of the contact spring be overcome so that the inertial body is set in motion. The contact spring is then deflected by the inertial body and bent in the direction of the second contact mounted in the housing. The contact pair is formed by the contact spring and the contact mounted in the housing; the inertial body does not have any electrical function. The two contact springs are coated in the region of their contact surfaces with usual contact material which meets high demands as regards corrosion resistance and low contact resistance. When the inertial body is in its rest position the contact springs have a predetermined spacing from each other which may be very small, thereby ensuring a small travel of the inertial body and as a result a short response time. Since moreover the inertial body requires a mass of only for example 25 to 35 g, the mechanical contactor can be made extremely compact and of low weight.

In a further development of the invention steps are taken to prevent contact bounce. The first step provided is that the second contact spring mounted in the housing has a predetermined spacing at its free end from the adjacent inner wall of the housing and is deflectable in the direction towards the inner wall of the housing by the inertial body via the first contact spring arranged therebetween. When the inertial body preferably formed as a ball is set in motion and the first contact spring strikes against the second, the latter can yield resiliently, thereby damping the impact. In this manner, not only bouncing of the contact springs off each other is avoided but in addition the duration of the contacting is also increased. The mechanical contractor according to the invention thus provides a clean trigger pulse of adequate duration.

As a second measure for avoiding contact bounce a spring means, preferably a spring blade, subjected to predetermined bias is in frictional engagement with the surface of the inertial body. The movement of the body in the direction of the contact spring mounted in the housing is dampened by friction so that the Q-factor of the mechanical resonant system formed by the contact springs and the inertial body is reduced. The spring blade is preferably arranged above the upper side of the inertial body so that it also prevents or at least greatly dampens the vertical motions thereof.

Due to its compact construction the contactor according to the invention is excellently suitable for fitting directly onto the jacket of a gas generator in the restraining system, for example a pyrotechnical belt pretensioner.

Further features and advantages of the invention will be apparent from the following description and from the drawings, to which reference is made and in which:

FIG. 1 shows a vertical longitudinal section of the embodiment of the mechanical contactor shown in perspective in FIG. 4;

FIG. 2 shows a vertical section through the contactor according to FIG. 4;

FIG. 3 is a horizontal section through the contactor according to FIG. 4;

FIG. 4 is a perspective view of a first embodiment of the mechanical contactor;

FIG. 5 is a sectional view of a further development of the embodiment of the contactor shown in FIGS. 1 to 4 with part of a safety belt restraining system;

FIG. 6 is a section transversely of the section plane in FIG. 5;

FIG. 7 is a partial section along a plane perpendicular to the section of FIG. 5.

Figure 8:
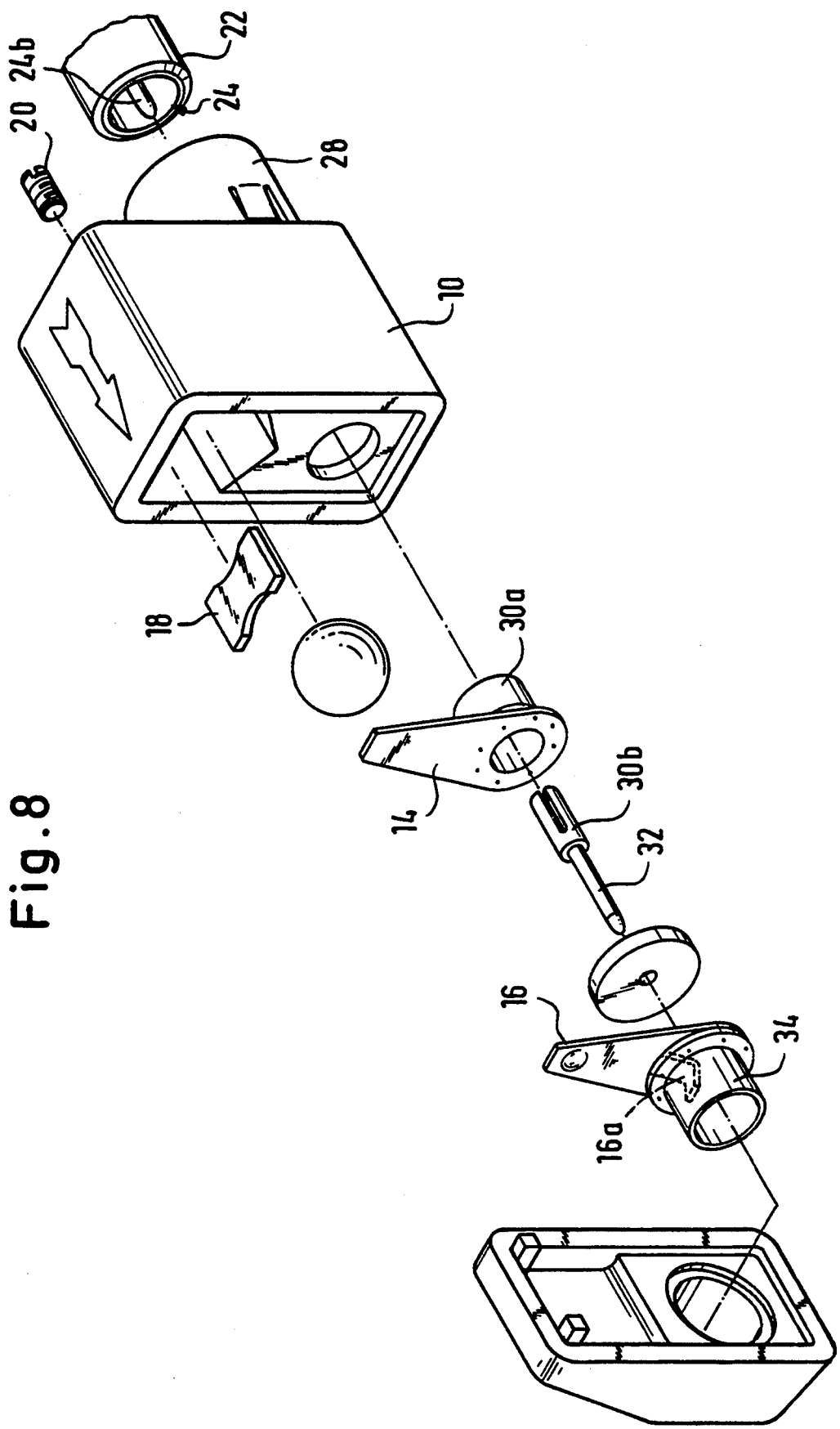
FIG. 8 is a perspective view of the embodiment of the contactor shown in FIGS. 5 to 7.

A ball 12 is movably accommodated as a vehicle-sensitive inertial body in the interior of a generally rectangular housing 10. The ball 12 rests on a prism-like bottom wall of the housing 10. The latter consists of a bottom member 10a and a cover member 10b. It is provided with laterally integrally formed mounting flanges 10c. The bottom member 10a and cover member 10b are adhered or welded to each other. In the bottom member 10a of the housing 10 two contact springs 14, 16 are mounted. The contact springs 14, 16 are bent at right-angles and led out of the bottom member 10a of the housing. Their free ends led out of the housing form connection members for a complentary plug means. The outer connection portions of the contact springs 14, 16 are surrounded by an integrally formed plug base 10d of the housing 10.

A spring blade 18 anchored in the bottom member 10a of the housing 10 and bent at right-angles bears under predetermined bias on the upper side of the mass ball 12 and is in frictional engagement with the latter. The first spring blade 14 is also held in engagement with the surface of the mass ball 12 under a predetermined bias and urges said ball against the end of an adjusting screw 20 which projects into the interior of the housing, said screw being screwed into a threaded bore of the bottom member 10a of the housing.

The contact springs 14, 16 are at a predetermined distance s from each other (FIG. 1). Furthermore, the contact spring 16 is a predetermined distance d from the inner wall of the housing adjacent said spring. The contactor is installed in the vehicle in a direction which is indicated by an arrow F (FIG. 4) arranged clearly visible on the cover member 10b of the housing. Under the action of a vehicle deceleration the mass ball 12 tends to deflect the contact spring 14 in the direction towards the contact spring 16. However, it does not start moving until its inertial force overcomes the biasing force of the contact spring 14. In addition, the movement of the mass ball 12 is restricted by the friction at the spring blade 18. The sum of the biasing force of the contact spring 14 and the frictional force between spring blade 18 and the surface of the mass ball 12 is selected in such a manner that said ball starts moving at a predetermined value of the vehicle deceleration. By means of the adjusting screw 20 said value can be set. When this setting has been carried out the adjusting screw 20 is preferably sealed with resist. In a simplified embodiment the adjusting screw 20 is dispensed with.

When the predetermined deceleration value is exceeded the mass ball 12 starts to move and is accelerated with deflection of the contact spring 14. Since the distance s between the contact springs 14, 16 may be very small, for example 1 or 2 mm, the contact springs 14, 16 come into contact with each other after a very short period of time which is calculated by the known law $s = \frac{1}{2} \Delta a \, t^2$. If the deceleration is adequate, the contact spring 16 is now also deflected and in this manner dampens the impact exerted by the mass ball 12. The deflection of the second contact spring 16 not only prevents bouncing of the contact spring 14 but also results in lengthening the period of time for which reliable contacting is established. Due to the friction caused by the spring blade 18 the resonant system consisting of the contact springs 14, 16 and the mass ball 12 is highly dampened so that any inclination to vibrate is suppressed. The spring blade 18 additionally prevents undesired vertical movements of the mass ball 12.

It has been found that the damping of the impact exerted by the mass ball 12 by the deflection of the second contact spring 16 prevents any contact bounce and consequently a clean trigger pulse of adequate duration can be generated. Erroneous activations are reliably avoided by the biasing of the contact spring 14 and the damping by means of the spring blade 18. Finally, the contact springs 14, 16 may be made as contact spring blades from proven materials and in addition coated in the contact region with high-quality contact materials which are resistant to corrosion and ensure a low contact resistance. The contactor therefore operates very reliably. A low mass of for example 25 to 35 g is sufficient for the mass ball 12. In conjunction with the short travel of the mass ball 12 of for example only 1 to 2 mm up to contacting this gives an extremely compact design of the contactor. In the embodiment shown in FIGS. 5 to 8 this fact is exploited in that the contactor is combined with a restraining system, in particular a pyrotechnical belt tightener, to give a compact assembly.

The embodiment of the contactor shown in FIGS. 5 to 8 is intended to be placed on the cylindrical jacket of a pyrotechnical gas generator 22 in a belt retractor with belt tightener. Belt retractor and belt tightener are only indicated in FIG. 5 because they are otherwise of conventional construction. The pyrotechnical gas generator 22 is provided at its free end with plug coupling elements 24 for an electrical igniter 26. As regards all the functional parts, the mechanical contactor is constructed identically to the embodiment according to FIGS. 1 to 4 and will therefore not be described again. Integrally formed on the housing 10 in this embodiment is a bush 28 which is adapted to be pushed onto the jacket of the gas generator 22. The pushed-on bush 28 is secured by means of a nose 28a which is resiliently integrally formed in the side wall of the bush 28 and engages into a recess in the jacket surface of the gas generator 22. At its bottom wall the bush 28 is provided with plug coupling elements 30 which project into the interior therewith and which are complementary to the plug coupling elements 24 of the gas generator 22. Said plug coupling elements 24, 30 form a coaxial plug connection. The radially outer connection 30a of the plug coupling elements 30 surrounds the radially inner axial connection 30b, which is formed as socket. A corresponding axial connection pin 24b of the plug coupling elements 24 is insertable into the connection 30b. The connection 30a is insertable into the radially outer socket member 24a of the plug coupling elements 24.

The first contact spring 14 is connected to the radially outer connection 30a of the plug coupling elements 30. The second contact spring 16 terminates at its portion led out of the interior of the housing 10 as bent contact blade 16a. Said contact blade 16a is in resilient engagement with the surface of a contact member 32 in the form of an axial connection pin which is connected integrally and coaxially to the connection 30b. The contact member 32 is surrounded by a coaxial contact member 34 in the form of a socket member which is connected to the contact spring 16. The contact members 32 and 34 are complementary to a coaxial connector 36. The radially inner connection or terminal of the latter is surrounded by a cylindrical sleeve 38 of insulating material which has an encircling groove 40. When the connector 36 is attached the front end of the sleeve 38 engages beneath the bent-over end of the spring blade 16a and lifts the latter off the contact member 32. As long as the connector 36 is not attached, the spring blade 16a forms a short circuit between the plug coupling elements 24 of the electrical igniter 26 of the gas generator 22 when the mechanical contactor is pushed onto the gas generator. This short circuit prevents the buildup of electrostatic charges which could lead to unintentional activation of the electrical igniter. It is only when the connector 36 is attached that the safeguarding of the electrical igniter 36 is cancelled. The spring blade 16a then engages into the encircling groove 40 of the sleeve 30 in order to secure the connector 36 to the contactor housing. As can be seen in FIG. 5, the latter forms as a whole an intermediate connector between the connector 36 and the gas generator 22. The entire contactor can therefore easily be integrated into existing constructions and is suitable also for optional equipment of a restraining system which can be connected to a central vehicle-sensitive control unit without modifying the plug connections.

What is claimed is:

1. A vehicle-sensitive mechanical contactor for activating a belt pretensioner in a safety belt restraining system, said belt pretensioner having a pyrotechnical gas generator with an electrical igniter, and said contactor comprising:

a housing having a wall defining an inner chamber;

an inertial mass body accommodated in said housing and movable therein between a rest position and a release position;

an electrical pair comprising a first contact member and a second contact member, said first and second contact members each having a first end extending into said chamber and a second end extending through said wall and out of said chamber;

said first contact member being spring loaded to bear against said inertial mass body with a predetermined spring bias when said inertial mass body is in said rest position and said second contact member being spaced from said first contact member when said inertial mass body is in said rest position;

and said first contact member being movable by said inertial mass body into contacting engagement with said second contact member after said predetermined spring bias is overcome by inertial forces developed by said inertial mass body under vehicle deceleration;

said gas generator being generally cylindrical in shape and said housing having an integral socket adapted to be fitted on said gas generator;

said gas generator and said socket having cooperating contact pairs for connecting said electrical igniter to said contactor.

2. A contactor as set forth in claim 1, wherein each of said first and second contact members is formed by a contact spring.

3. A contactor as set forth in claim 1, wherein said second contact member has its first end spaced a predetermined distance from said housing wall when the inertial mass body is in said rest position and is deflectable under the action of inertial forces developed by said inertial mass body and transmitted by said first contact member into abutment against said housing wall.

4. A contactor as set forth in claim 1, wherein a flat dampening member is resiliently held in frictional engagement with said inertial mass body.

5. A contactor as set forth in claim 1, wherein a side of said inertial mass body opposite said first contact member bears against an end of an adjustment screw extending through said housing wall.

6. A contactor as set forth in claim 1, wherein said inertial mass body is spherical.

7. A contactor as set forth in claim 1, wherein said housing has a further socket for receiving a plug, said plug having a pair of contacts complementary with a pair of contacts in said further socket and connected to a pair of electrical supply lines.

8. A contactor as set forth in claim 7, wherein a first contact of said contact pair of said socket is connected with a first contact of said contact pair of said further socket, and a second contact of said contact pair of said socket is insulated from a second contact of said contact pair of said further socket, and one of said first and second contact members is connected to one of said second contacts and the other of said contact members to the other of said second contacts of the contact pairs of said socket and said further socket.

9. A contactor as set forth in claim 8, wherein said contact pair of said further socket is short-circuited by said second end of one of said first and second contact members when said plug is not fitted in said further socket.

10. A contactor as set forth in claim 9, wherein said second end of said one of said first and second contact members is formed by a contact spring resiliently held in contacting engagement with said first contact of the contact pair of said further socket when the plug is not fitted in said further socket, and said plug is provided with a spreading member of electrically insulating material for spreading said contact spring away from said first contact when the plug is fitted in said further socket.

11. A contactor as set forth in claim 7, wherein said cooperating contact pairs of said socket and said gas generator form a coaxial plug connection.

12. A contactor as set forth in claim 7, wherein said complementary contact pairs of said further socket and said plug form a coaxial plug connection.

* * * * *